United States Patent
Takahashi

3,829,198
Aug. 13, 1974

[54] WIDE ANGLE LENS SYSTEM
[75] Inventor: Yasuo Takahashi, Tokyo, Japan
[73] Assignee: Asahi Kogaku Kogyo Kabushiki Kaisha, Tokyo-to, Japan
[22] Filed: Mar. 26, 1973
[21] Appl. No.: 345,147

[30] Foreign Application Priority Data
Mar. 27, 1972 Japan.............................. 47-30456

[52] U.S. Cl. ............................... 350/220, 350/176
[51] Int. Cl. ............................................. G02b 9/34
[58] Field of Search........................... 350/220, 176

[56] References Cited
UNITED STATES PATENTS
2,781,695   2/1957   Klemt ............................ 350/220
3,466,117   9/1969   Feder .............................. 350/220

*Primary Examiner*—John K. Corbin
*Attorney, Agent, or Firm*—Wolder & Gross

[57] ABSTRACT

A wide angle lens system includes six consecutively designated successive lenses, the first lens being a negative meniscus lens with a front convex face, the second and third lenses forming a positive cemented doublet and being a negative meniscus lens with a front convex face and a positive lens with a front face of greater curvature than the rear face, the fourth and fifth lenses forming a cemented positive doublet with the fifth lens having very low power, and a negative sixth lens with a rear convex face. The lens system satisfies the following requirements;

$F/1.2 < |F_1| < F/0.8$, $F_1 < 0$
$0.1 < n_2 - n_3 < 0.16$, $0.1F < r_4 < 0.15F$
$20 < \nu_4 - \nu_5 < 24$, $0.0005 < n_4 - n_5 < 0.02$
$F/2.2 < F_{1,2,3,4,5} < F/1.6$
$0.2F < |r_9| < 0.3F$, $r_9 < 0$ wherein
$F$ is the focal length of the lens system;
$N_i$ is the $d$-line refractive index of the $i$th lens;
$F_{1, 2, \ldots i}$ is the combined focal length of the subsystem comprising the first to the $i$th lens;
$\nu_i$ is the Abbe's number of the $i$th lens; and
$r_j$ is the radius of curvature of the $j$th surface, confronting cemented surfaces defining a single surface.

1 Claim, 5 Drawing Figures

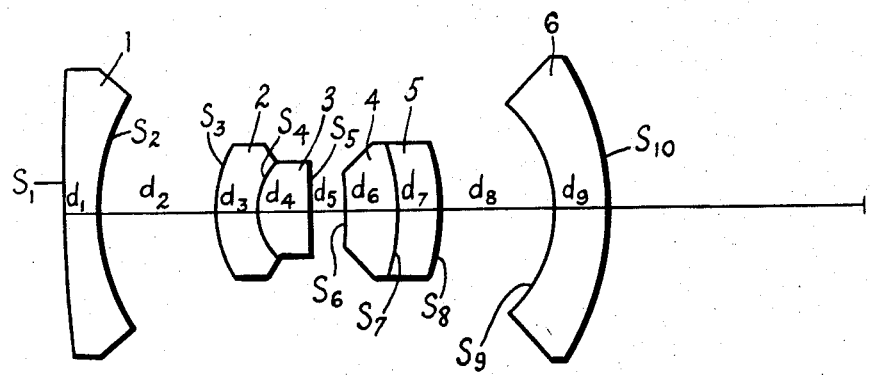
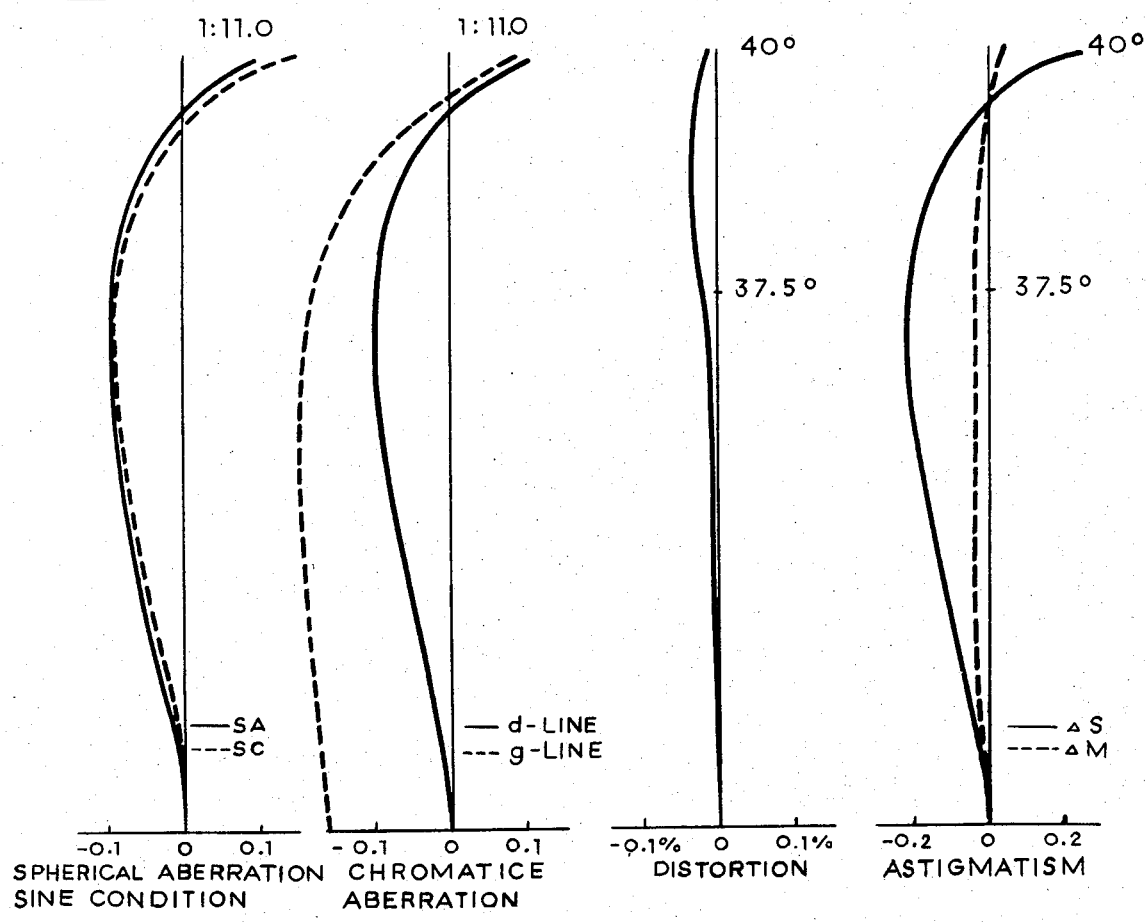

WIDE ANGLE LENS SYSTEM

The present invention relates generally to improvements in lenses and it relates particularly to an improved wide angle lens system.

Wide angle lens systems heretofore available possess numerous drawbacks and disadvantages. They are generally bulky devices, are characterized by high distortion, high aberrations and otherwise leave much to be desired.

It is accordingly a principle object of the present invention to provide an improved lens system.

Another object of the present invention is to provide an improved wide angle lens system.

Still another object of the present invention is to provide an improved wide angle lens system characterized by its compactness, low aberration properties and relative free from distortion.

The above and other objects of the present invention will become apparent from a reading of the following description taken in conjunction with the accompanying drawing which illustrates a preferred embodiment thereof.

In a sense the present invention contemplates the provision of a wide angle lens system including six consecutively designated lens as, a negative first lens, a negative second lens and a positive third lens cemented to form a doublet, a positive fourth lens and a low power fifth lens cemented to form a doublet and a negative power sixth lens, the parameters of the lens system satisfying the following conditions (I) to (V):

I. $F/1.2 < |F_1| < F/0.8$, $F_1 < 0$
II. $0.1 < n_2 - n_2 < 0.16$, $0.1f < r_4 < 0.15F$
III. $20 < \nu_4 - \nu_5 < 24$, $0.005 < n_4 - n_5 < 0.02$
IV. $F/2.2 < F_{1,2,3,4,5} < F/1.6$
V. $0.2F < |r_9| < 0.3F$, $r_9 < 0$ wherein:

$F$ is the focal length of the entire system;
$F_{1,2,...i}$ is the combined focal length of the subsystem comprising lenses from the first lens to the $i$th lens;
$n_i$ is the $d$-line refractive index of the $i$th lens,
$n_d$ is the $d$-line refractive index,
$n_g$ is the $g$-line refractive index,
$\nu_i$ is the Abbe's number of the $i$th lens,
$r_j$ is the curvature radius of the $j$th surface, and
$d_j$ is the spacing or lens thickness between the $j$th surface and the $(j+1)$th surface.

The functions and applications of the conditions to be satisfied by the present improved lens system are hereinafter described in detail.

The condition (I) functions to limit the light rays being incident at a wide angle upon the second and the following lenses and to thereby improve the compensation of aberration as generally occurs in the wide-angle lens system. This condition (I), however, serves to prescribe an essential combination of powers from the view point of lens composition in the entire system. When a negative lens of extremely high power is used as the first lens, that is, $F_1$ is shorter than $F/1.2$, the following groups would be highly influenced and aberration on the second surface would increase, resulting in that compensation by the following groups becomes difficult and an increase in the number of lenses must be considered and may be required. This would be inconvenient to maintain the Petzval's sum at a suitable level in relation to $d_2$, the distance between the second and third lens surfaces. When $F_1$ is longer than $F/0.8$, on the contrary, the angle would be so wide relative to the following lens groups that compensation would be even more difficult.

The condition (II) functions to enable a positive spherical aberration occurring on the third surface to be fully compensated. Although spherical aberration at the fourth surface is usually compensated in the longer direction when the difference of refractive indices is relatively large and in the shorter direction when the difference of refractive indices is relatively small, an excessively large difference of refractive indices and a smaller radius of curvature would result in excessive compensation of spherical aberration, increase of coma aberration and occurrence of an aberration in the direction in which the image is reduced for the light rays of a relatively large incident angle and a high incident height. On the other hand, with $r_4$ longer than $0.15F$ and no difference of refractive indices would bring about an aberration in the inverse direction. The manner of composition in which the aberration occurring on the third surface is left insufficiently compensated and fully compensated by the following surfaces or groups would adversely influence distortion. Thus, the condition (II) is easily satisfied by the present lens system for proper compensation.

The condition (III) functions to improve compensation of chromatic aberration on the fourth and fifth lenses. The fifth lens should be of almost no power while $n_d$ of the fourth lens and $n_g$ of the fifth lens should be high for improved compensation of chromatic aberration. The difference of $n_d$ beyond this range would greatly affect not only the chromatic aberration but also the other types of aberration. The preferable difference of $n_d$ is about 0.005.

The condition (IV) serves to enable distortion on the sixth lens to be reduced closely to the desired value in association with the condition (V). When $F_{1,2,3,4,5}$ is shorter than $F/2.2$, the power of the sixth lens would be so intensified that the Petzval's sum reduces and the radius of curvature also would be so intensified that various types of aberration are necessarily increased. When $F_{1,2,3,4,5}$ is longer than $F/1.6$ on the other hand, distortion could not be effectively compensated and compensation of the other types of aberration would be adversely affected.

The condition (V) is to maintain proper burdens on ninth and tenth surfaces whereby to keep distortion substantially compensated or well balanced. When the ninth surface is negative and of shorter radius of curvature than $0.2F$, compensation on the ninth surface would be excessive or result in an increase of coma aberration. On the other hand, $r_9$ the radius of curvature of the ninth surface being longer than $0.3F$ would necessarily result in insufficient compensation distortion and adversely affect compensation of spherical aberration.

BRIEF DESCRIPTION OF THE DRAWING

FIG. 1 is a front elevational view of a wide angle lens system embodying the present invention; and FIGS. 2(a) to 2(d) illustrate the characteristic curves of the system with respect to various types of aberration.

DESCRIPTION OF THE PREFERRED EMBODIMENT

Referring now to the drawing which illustrates a preferred embodiment of the present invention, the reference numerals 1, 2, 3, 4, 5 and 6 consecutively designate the first to the sixth lenses respectively from the front lens 1 to the rear lens.

The first lens 1 is a negative meniscus lens of thickness $d_1$ and with an index of refraction $n_1$, a front surface $S_1$ with a radius of curvature $r_1$ and a rear surface $S_2$ with a radius of curvature $r_2$ which is less than $r_1$. The second and third lenses are cemented at their similar mating confronting faces to form a doublet unit subsystem which is positive, the second lens being a negative meniscus lens having a refractive index $n_2$, a thickness $d_3$, convex front surface $S_3$ of radius $r_3$, spaced a distance $d_2$, from second surface $S_2$ and a concave rear face coinciding with the third lens convex front face to define a fourth surface $S_4$, and the third lens being positive with an index of refraction $n_3$, a thickness $d_4$, and a rear fifth surface $S_5$ of radius of curvature $r_5$.

The fourth lens 4 and fifth lens 5 are cemented together at their confronting faces defining a seventh rearwardly convex surface $S_7$ of radius of curvature $r_7$ to form a positive doublet lens unit subsystem, fourth lens 4 being positive and having an index of refraction $n_4$, a thickness $d_6$, and a front sixth surface $S_6$ spaced a distance $d_5$ from fifth surface $S_5$ and fifth lens 5 having an index of refraction $n_5$, a thickness $d_7$ and a rear eighth surface $S_8$ of radius of curvature $r_8$ and having little or no power. The sixth lens 6 is a negative meniscus lens with an index of refraction $n_6$, a thickness $d_9$, a concave front ninth face $S_9$ of radius of curvature $r_9$ and spaced from eighth surface $S_8$ a distance $d_8$, and a convex rear tenth surface $S_{10}$ of radius of curvature $r_{10}$. The Abbe's numbers of the lenses 1, 2, 3, 4, 5 and 6 are respectively $\nu_1$, $\nu_2$, $\nu_3$, $\nu_4$, $\nu_5$, $\nu_6$.

The following Table I sets forth as a specific example of the improved lens system by way of illustration the radii of curvatures $r_j$ of the lens surfaces $S_1$ to $S_{10}$, the distances $d_j$ between each surface $S_j$ and the next successive surface $S_{j+1}$, the distances being lens thicknesses or air spaces $n_i$ the $d$-line index of refraction of the $i$th lens and $\nu_i$ the Abbe's number of the $i$th lens. The lens system has a focus F = 100 it being understood that the radii $r_j$ and distances $d_j$ may be proportionately changed for changes in the lens system focal length F. Also given are the focal length $F_1$ of the first lens and the focal length $F_{1,2,3,4,5}$ of the combined first five lenses 1 to 5.

TABLE I

| | | | | | | |
|---|---|---|---|---|---|---|
| $r_1$ | 585.51 | $d_1$ | 7.69 | $n_1/\nu_1$ | 1.61375/56.4 |
| $r_2$ | 52.68 | $d_2$ | 23.08 | | |
| $r_3$ | 26.50 | $d_3$ | 7.69 | $n_2/\nu_2$ | 1.74400/44.8 |
| $r_4$ | 12.27 | $d_4$ | 10.77 | $n_3/\nu_3$ | 1.60729/59.4 |
| $r_5$ | −869.76 | $d_5$ | 4.62 | | |
| $r_6$ | −64.54 | $d_6$ | 10.77 | $n_4/\nu_4$ | 1.81600/46.8 |
| $r_7$ | −39.80 | $d_7$ | 8.46 | $n_5/\nu_5$ | 1.80518/25.4 |
| $r_8$ | −41.68 | $d_8$ | 23.08 | | |
| $r_9$ | −25.89 | $d_9$ | 10.77 | $n_6/\nu_6$ | 1.72825/28.5 |
| $r_{10}$ | −62.57 | | | | |

$$F_1 = -94.8$$
$$F_{1,2,3,4,5} = 52.3$$

The following Table II sets forth Seidels coefficients for the lens system set forth in Table I.

TABLE II

| | $S_1$ | $S_2$ | $S_3$ | P | $S_5$ |
|---|---|---|---|---|---|
| 1 | 0 | 0.01 | 0.04 | 0.07 | 0.55 |
| 2 | −9.44 | −0.36 | −0.01 | −0.72 | −0.03 |
| 3 | 75.24 | 1.85 | 0.05 | 1.61 | 0.04 |
| 4 | −73.33 | 1.49 | −0.03 | −0.40 | 0.01 |
| 5 | 1.52 | −1.11 | 0.81 | 0.04 | −0.62 |
| 6 | −9.14 | 3.12 | −1.06 | −0.70 | 0.60 |
| 7 | 0.16 | −0.02 | 0 | 0.01 | 0 |
| 8 | 33.69 | −3.32 | 0.33 | 11.07 | −0.14 |
| 9 | −15.06 | −1.72 | −0.20 | −1.63 | −0.21 |
| 10 | 1.45 | −0.39 | 0.11 | 0.67 | −0.21 |
| Σ | 5.09 | −0.46 | 0.02 | 0.03 | 0 |

The highly superior optical characteristics and performance of the lens system specifically set forth in Table I are demonstrated by the group of aberration curves of the lens system of Table I illustrated in FIG. 2.

While there has been described and illustrated a preferred embodiment of the present invention, it is apparent that numerous alterations and additions may be made without departing from the spirit thereof.

I claim:

1. A wide angle lens system comprising six successively designated lenses in which the second and third lenses are cemented at their mating confronting faces to form a first doublet subsystem and the fourth and fifth lenses are cemented at their confronting mating faces to form a second doublet subsystem and having the following dimensions and values;

| | | | | | | |
|---|---|---|---|---|---|---|
| $r_1$ | 585.51 | $d_1$ | 7.69 | $n_1/\nu_1$ | 1.61375/56.4 |
| $r_2$ | 52.68 | $d_2$ | 23.08 | | |
| $r_3$ | 26.50 | $d_3$ | 7.69 | $n_2/\nu_2$ | 1.74400/44.8 |
| $r_4$ | 12.27 | $d_4$ | 10.77 | $n_3/\nu_3$ | 1.60729/59.4 |
| $r_5$ | −869.76 | $d_5$ | 4.62 | | |
| $r_6$ | −64.54 | $d_6$ | 10.77 | $n_4/\nu_4$ | 1.81600/46.8 |
| $r_7$ | −39.80 | $d_7$ | 8.46 | $n_5/\nu_5$ | 1.80518/25.4 |
| $r_8$ | −41.68 | $d_8$ | 23.08 | | |
| $r_9$ | −25.89 | $d_9$ | 10.77 | $n_6/\nu_6$ | 1.72825/28.5 |
| $r_{10}$ | −62.57 | | | | | wherein $r_j$ is the radius of curvature of the $j$th lens surface, $d_j$ is the distance between the $j$th lens surface and the $j$+1 lens surface, the lens surfaces being consecutively successively designated with cemented lens faces defining a single surface and the values $r_j$ and $d_j$ being relative to a focal length of the system equal to 100, $n_i$ is the $d$-line refractive index of the $i$th lens and $\nu_i$ is the Abbe's number of the $i$th lens.

* * * * *